US 8,981,700 B2

(12) United States Patent
Okada et al.

(10) Patent No.: US 8,981,700 B2
(45) Date of Patent: Mar. 17, 2015

(54) VEHICLE SEAT APPARATUS

(71) Applicant: Aisin Seiki Kabushiki Kaisha, Kariya-shi (JP)

(72) Inventors: Takashi Okada, Kariya (JP); Soichiro Hozumi, Nishio (JP); Toshiro Maeda, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 195 days.

(21) Appl. No.: 13/718,250

(22) Filed: Dec. 18, 2012

(65) Prior Publication Data
US 2013/0154534 A1 Jun. 20, 2013

(30) Foreign Application Priority Data

Dec. 20, 2011 (JP) ................. 2011-278738

(51) Int. Cl.
*G01R 31/02* (2006.01)
*G05D 3/20* (2006.01)
*B60N 2/02* (2006.01)
(52) U.S. Cl.
CPC ............ *G05D 3/20* (2013.01); *B60N 2/0232* (2013.01); *B60N 2002/0272* (2013.01)
USPC ............................ 318/490; 318/432; 318/466

(58) Field of Classification Search
USPC ............... 318/490, 432, 466, 49, 283, 5, 139, 318/701, 280
See application file for complete search history.

(56) References Cited

U.S. PATENT DOCUMENTS 4,572,543 A * 2/1986 Tsuge et al. ................. 280/807

FOREIGN PATENT DOCUMENTS

JP 2001-277909 10/2001

* cited by examiner

*Primary Examiner* — Karen Masih
(74) *Attorney, Agent, or Firm* — Oblon, McClelland, Maier & Neustadt, L.L.P.

(57) ABSTRACT

Provided is a vehicle seat apparatus including drive mechanism for moving configuring elements of a vehicle seat using a motor drive, in order to adjust a posture; control mechanism for controlling the operation of the drive mechanism; a rotation sensor which outputs pulse signals synchronized with a motor rotation; position detection mechanism for detecting a movement position of the configuring elements by counting pulse edges of the pulse signals according to the motor rotation direction; and reverse rotation detection mechanism for estimating that a reverse rotation has occurred in the motor rotation, in a situation where the pulse edges are continuously detected after the motor drive is stopped, if the rotation direction is unchanged, in a case where a motor rotation speed indicated by the pulse edges after the stop becomes faster than the motor rotation speed before the motor drive is stopped.

13 Claims, 9 Drawing Sheets

VEHICLE SEAT APPARATUS

CROSS REFERENCE TO RELATED APPLICATIONS

This application is based on and claims priority under 35 U.S.C. §119 to Japanese Patent Application 2011-278738, filed on Dec. 20, 2011, the entire content of which is incorporated herein by reference.

TECHNICAL FIELD

This disclosure relates to a vehicle seat apparatus.

BACKGROUND DISCUSSION

In the related art, in order to adjust a posture, there is a vehicle seat apparatus capable of adjusting a position of configuring elements of a vehicle seat, such as a seat cushion or a seat back, using a drive source. For example, JP 2001-277909A discloses a seat slide apparatus capable of adjusting a slide position of the seat cushion using a motor drive. That is, the seat slide apparatus includes a lower rail fixed to a vehicle floor and an upper rail provided to be relatively movable with respect to the lower rail. Then, a configuration is adopted in which the upper rail is moved along the extending direction of the lower rail, based on the drive force of a motor.

Furthermore, the seat slide apparatus detects a movement position of the upper rail by counting (integrating) motor pulses, that is, pulse edges of output pulse signals using a rotation sensor provided in the motor. Then, a function, for example, such as a so-called memory seat which returns the seat to a memorized position by performing a position control accordingly can be installed.

In addition, it is necessary to identify a rotation direction of the motor in order to accurately detect position by counting such motor pulses. However, after the motor drive is stopped, it is no longer possible to identify the rotation direction from a control command thereof. In this regard, in the above-described related art, after the motor drive is stopped, the influence due to deflection occurring in a power transmission member thereof is considered and the count rate of the motor pulses is corrected. Then, accordingly, a configuration to reduce an error in detecting the position is adopted.

However, in a stage before movement of a seat is regulated by a slide lock mechanism, factors other than deflection of a power transmission member as described above, for example, when parking on a hill or the like may cause the position of the seat to be moved. In this case, there is still a possibility that a detection error may occur since the rotation direction of a motor cannot be identified. Then, such a detection error may occur in other vehicle seat apparatuses such as a seat reclining apparatus, a seat lifting apparatus or an ottoman apparatus, for example, and there has also been a need for improvements thereof.

A need thus exists for a vehicle seat apparatus which is not susceptible to the drawback mentioned above. A need thus exists for a vehicle seat apparatus capable of identifying a rotation direction after a motor drive is stopped, with a simple configuration, and capable of suppressing the occurrence of an error in detecting a position based on counting motor pulses thereof.

SUMMARY

In order to solve the above-described problem, according to a first aspect of the embodiment disclosed here, there is provided a vehicle seat apparatus including drive mechanism for moving configuring elements of a vehicle seat using a motor drive, in order to adjust a posture; control mechanism for controlling the operation of the drive mechanism; a rotation sensor which outputs pulse signals synchronized with a motor rotation; position detection mechanism for detecting a movement position of the configuring elements by counting pulse edges of the pulse signals according to the motor rotation direction; and reverse rotation detection mechanism for estimating that a reverse rotation has occurred in the motor rotation, in a situation where the pulse edges are continuously detected after the motor drive is stopped, if the rotation direction is unchanged, in a case where a motor rotation speed indicated by the pulse edges after the stop becomes faster than the motor rotation speed before the motor drive is stopped.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
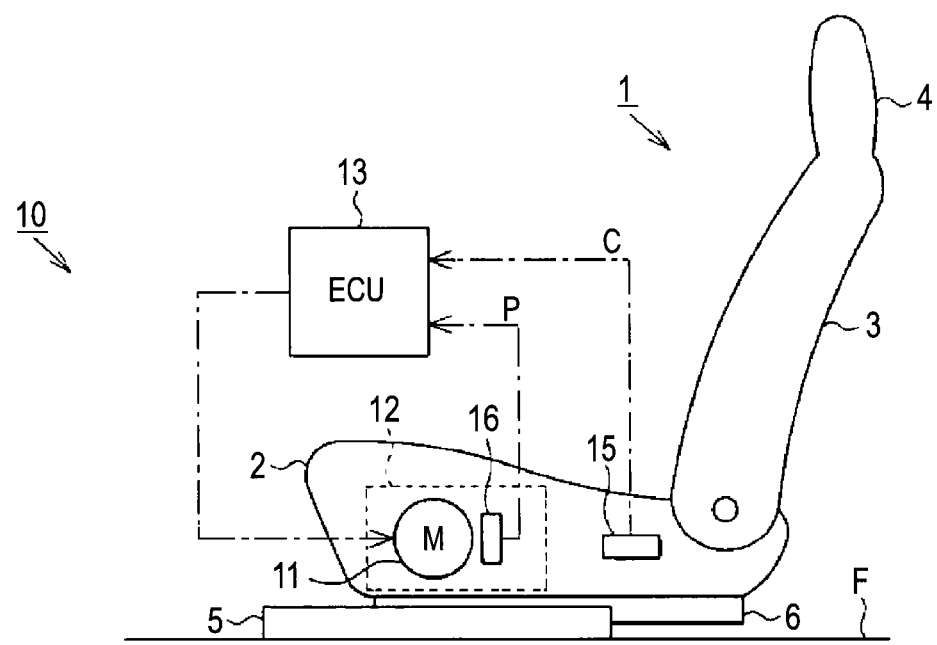
FIG. 1 is a schematic configuration diagram of a vehicle seat apparatus according to an embodiment disclosed here.

Hereinafter, an embodiment of a seat slide apparatus in this disclosure will be described with reference to the accompanying drawings.

A first aspect to the disclosure is a vehicle seat apparatus including drive mechanism for moving configuring elements of a vehicle seat using a motor drive, in order to adjust a posture; control mechanism for controlling the operation of the drive mechanism; a rotation sensor which outputs pulse signals synchronized with a motor rotation; and position detection mechanism for detecting a movement position of the configuring elements by counting pulse edges of the pulse signals according to the motor rotation direction, in which reverse rotation detection mechanism is provided, which estimates that a reverse rotation has occurred in the motor rotation in a situation where the pulse edges are continuously detected after the motor drive is stopped, if the rotation direction is unchanged, in a case where a motor rotation speed indicated by the pulse edges after the stop becomes faster than the motor rotation speed before the motor drive is stopped.

That is, the motor rotation until the motor drive is stopped is a normal rotation which is equal to the drive direction. In addition, even after the motor drive is stopped, the motor rotation is the normal rotation due to inertia. Then, if the rotation direction is unchanged, the motor rotation speed after the drive is stopped, based on the inertia, becomes slower than the motor rotation speed before the drive is stopped. Therefore, according to the above-described configuration, it is possible to detect a reverse rotation which occurs after the motor drive is stopped, using a simple configuration. As a result, it is possible to suppress the occurrence of an error in detecting the position based on counting the motor pulses.

A second aspect of the disclosure is the vehicle seat apparatus in which the rotation sensor outputs the pulse signals generated by pulse edges at ½ n rotation cycle, and the reverse rotation detection mechanism estimates that the reverse rotation occurs in the motor rotation in a case where an interval between two pulse edges continuously detected after the motor drive is stopped is wider than the interval from when the motor drive is stopped until the pulse edge first detected after the stop, and is narrower than the interval from the last pulse edge detected before the motor drive is stopped until the motor drive is stopped.

That is, in a case where the interval from when the motor drive is stopped until the pulse edge first detected after the motor drive is stopped is narrower, compared to the interval from the pulse edge lastly detected before the motor drive is stopped until the motor drive is stopped, there is a high possibility that the motor rotation until the pulse edge is detected may be the normal rotation. Then, in a case where the interval between two continuous pulse edges after the motor drive is stopped is narrower than the interval from the last pulse edge before the motor drive is stopped until the motor drive is stopped, if the rotation direction is unchanged, an inconsistency in which the motor rotation speed after the motor drive is stopped is faster than that when the motor drive is stopped, occurs. Therefore, according to the above-described configuration, it is possible to detect the reverse rotation occurring after the motor drive is stopped.

A third aspect of the disclosure is the vehicle seat apparatus in which the rotation sensor outputs the pulse signals generated by the pulse edges at ½ n rotation cycle, and the reverse rotation detection mechanism estimates that the reverse rotation occurs in the motor rotation in a case where the interval between two pulse edges continuously detected after the motor drive is stopped is narrower than the interval from the pulse edge lastly detected before the motor drive is stopped until the pulse edge first detected after the motor drive is stopped.

That is, even after the drive is stopped, the motor is rotated due to inertia. Then, in this case, the interval of two pulse edges continuously detected after the motor drive is stopped ought to be wider than the interval from the pulse edge lastly detected before the motor drive is stopped until the pulse edge first detected after the motor drive is stopped. In other words, if the rotation direction is unchanged, in this case as well, there occurs the inconsistency that the motor rotation speed after the motor drive is stopped is faster than that when the motor drive is stopped. Therefore, according to the above-described configuration, it is possible to detect the reverse rotation occurring after the motor drive is stopped.

A fourth aspect of the disclosure is the vehicle seat apparatus in which the reverse rotation detection mechanism estimates that the reverse rotation occurs in the motor rotation even in a case where it is determined that the reverse rotation has not occurred in the motor rotation, by the presumption, based on the pulse edge first detected after the motor drive is stopped, in a case where among the intervals of the respective pulse edges continuously detected after the motor drive is stopped, the interval of the last edges most recently detected is narrower than the interval of the edges detected immediately before the interval of the last edges.

That is, if the motor drive is in the normal rotation due to inertia even after the stop, the interval of the last edges most recently detected ought to be wider than the interval of the edges detected immediately before them. Therefore, according to the above-described configuration, it is possible to more accurately detect the reverse rotation occurring after the motor drive is stopped.

A fifth aspect of the disclosure is the vehicle seat apparatus in which the reverse rotation detection mechanism estimates that the reverse rotation occurs in the motor rotation, in a case where a combination of a rising edge and a falling edge continuously detected or a combination of the falling edge and the rising edge is set to be a pulse width, in a case where the pulse width detected after the motor drive is stopped is narrower than the pulse width detected before the motor drive is stopped.

That is by comparing a difference of the pulse widths before and after the motor drive is stopped, it is possible to detect the occurrence of a pulse edge which causes such a inconsistency that if the rotation direction is unchanged, the motor rotation speed after the motor drive is stopped is faster than that when the motor drive is stopped. Therefore, according to the above-described configuration, it is possible to detect the reverse rotation occurring after the motor drive is stopped.

According to this disclosure, it is possible to provide a vehicle seat apparatus capable of identifying the rotation direction after the motor drive is stopped, with a simple configuration, and capable of suppressing the occurrence of an error in detecting the position based on counting motor pulses thereof.

As illustrated in FIG. 1, a vehicle seat 1 includes a seat cushion 2, a seat back 3 provided to be freely tilted with respect to the rear end portion of the seat cushion 2, and a headrest 4 provided at the upper end of the seat back 3.

In addition, a pair of lower rails 5 arranged in parallel is provided on a vehicle floor F, and upper rails 6 provided to be relatively movable with respect to the respective lower rails 5 are mounted on the lower rails 5. Then, the seat cushion 2 of the vehicle seat 1 is fixed onto the upper rails 6.

That is, in the present embodiment, a seat slide apparatus 10 is formed of the lower rails 5 and the upper rails 6. In addition, the seat slide apparatus 10 of the present embodiment includes an actuator 12 as drive mechanism for moving the upper rails 6 using a motor 11 as a drive source, and an ECU 13 as control mechanism for controlling an operation of the actuator 12. Furthermore, the actuator 12 of the present embodiment has a well-known configuration where in such a manner that rotation of the motor 11 is decelerated and transmitted to a nut and screw mechanism, a relative position of the upper rails 6 is moved with respect to the lower rails 5 based on a screw contraposition. Then, in order to adjust a posture, by utilizing a function of the seat slide apparatus 10, a passenger can adjust the position of the vehicle seat 1 in the longitudinal direction (left and right direction in the drawing) of the vehicle, more specifically the position of the seat cushion 2 which is a configuring element thereof.

More specifically, an operation switch 15 is provided on the side surface (seat side) of the seat cushion 2 and an operation signal C output by the operation switch 15 is input to the ECU 13. Then, the ECU 13 controls the operation of the actuator 12 based on operation input of the passenger indicated in the operation signal C.

In addition, a rotation sensor 16 which outputs a pulse signal P synchronized with motor rotation is provided in the motor 11. Furthermore, a magnetic rotation sensor using a hall element is used in the rotation sensor 16 of the present embodiment. Then, the rotation sensor 16 outputs the pulse signal P such that a pulse edge (output level change) is generated at ½ the rotation cycle of the motor 11.

The ECU 13 counts (integrates) the pulse edges of the pulse signal I', that is, motor pulses, which are output by the rotation sensor 16 provided in the motor 11, and thereby detects a movement position of the upper rails 6. Then, a function, for example, such as a so-called memory seat which returns the seat to a memorized position by detecting the position by counting the motor pulses can be installed in the seat slide apparatus 10 of the present embodiment.

Figure 2:
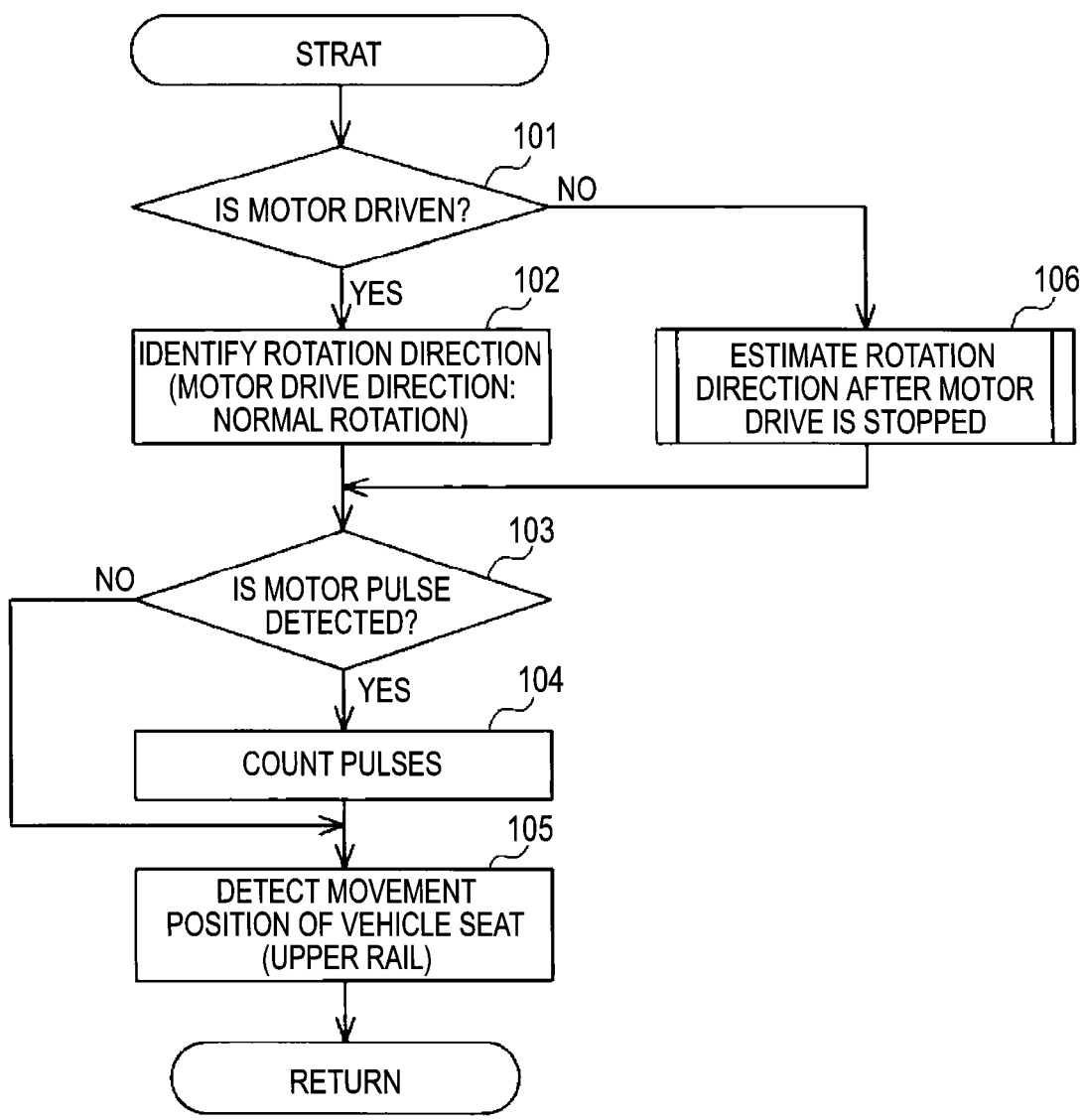
FIG. 2 is a flow chart illustrating a process sequence of detecting a position by counting motor pulses.

To describe in detail, as illustrated by the flow chart in FIG. 2, the ECU 13 as position detection mechanism first determines a state where the motor 11 is driven in order to move the vehicle seat 1 (upper rails 6), that is, whether or not the motor is driven (Step 101). Then, in a case where it is determined that the motor is driven (Step 101: YES), the ECU 13 identifies a rotation direction indicated by a control command thereof, that is, a drive direction, as the rotation direction of the motor 11 (normal rotation, Step 102).

Next, the ECU 13 determines whether or not the motor pulse is detected, that is, whether or not the pulse edge is generated in the pulse signal P output by the rotation sensor 16 (Step 103). Then, in a case where the motor pulse is detected (Step 103: YES), the ECU 13 counts the motor pulses (Step 104) and thereby detects the movement position of the upper rails 6, that is, the vehicle seat 1 (Step 105).

Furthermore, in the above-described Step 103, in a case where the motor pulse is not detected (Step 103: NO), the pulse counting in Step 104 is not performed. Then, in Step 105, the movement position (value of the movement position) detected in the previous cycle is set to be maintained.

In addition, in a case where it is determined that the motor is not driven in Step 101, that is, it is determined to be after the drive of the motor 11 has been stopped (Step 101: NO), the ECU 13 of the present embodiment performs an estimation process of the rotation direction (Step 106). Then, based on the estimated rotation direction, the ECU 13 is configured to perform each process in the above-described Steps 103 to 105.

That is, even after the drive of the motor 11 has been stopped, the ECU 13 of the present embodiment continues to detect the position by counting the motor pulses for a predetermined period of time. Further, the seat slide apparatus 10 of the present embodiment includes a well-known slide lock mechanism (not illustrated) which mechanically regulates the movement of the upper rails 6. Accordingly, the detecting process of the position after the motor drive has been stopped, as described above, continues until the slide lock mechanism is in a locked state. Then, in the present embodiment, it is configured to suppress the occurrence of an error in detecting the position based on the counting motor pulses accordingly.

Next, the estimation process of the rotation direction after the motor drive is stopped will be described.

The ECU 13 of the present embodiment monitors an elapsed time after each of the pulse edges is detected. In addition, in a state where the pulse edges are continuously detected after the motor drive is stopped, the ECU 13 determines whether or not the motor rotation speed after the drive is stopped, indicated by the respective pulse edges, is faster than the motor rotation speed before the drive is stopped, if the rotation direction is unchanged. Then, in a case where the pulse edges are generated such that the motor rotation speed after the drive is stopped is faster, the ECU 13 estimates that the reverse rotation occurs in the motor rotation.

Figure 3:
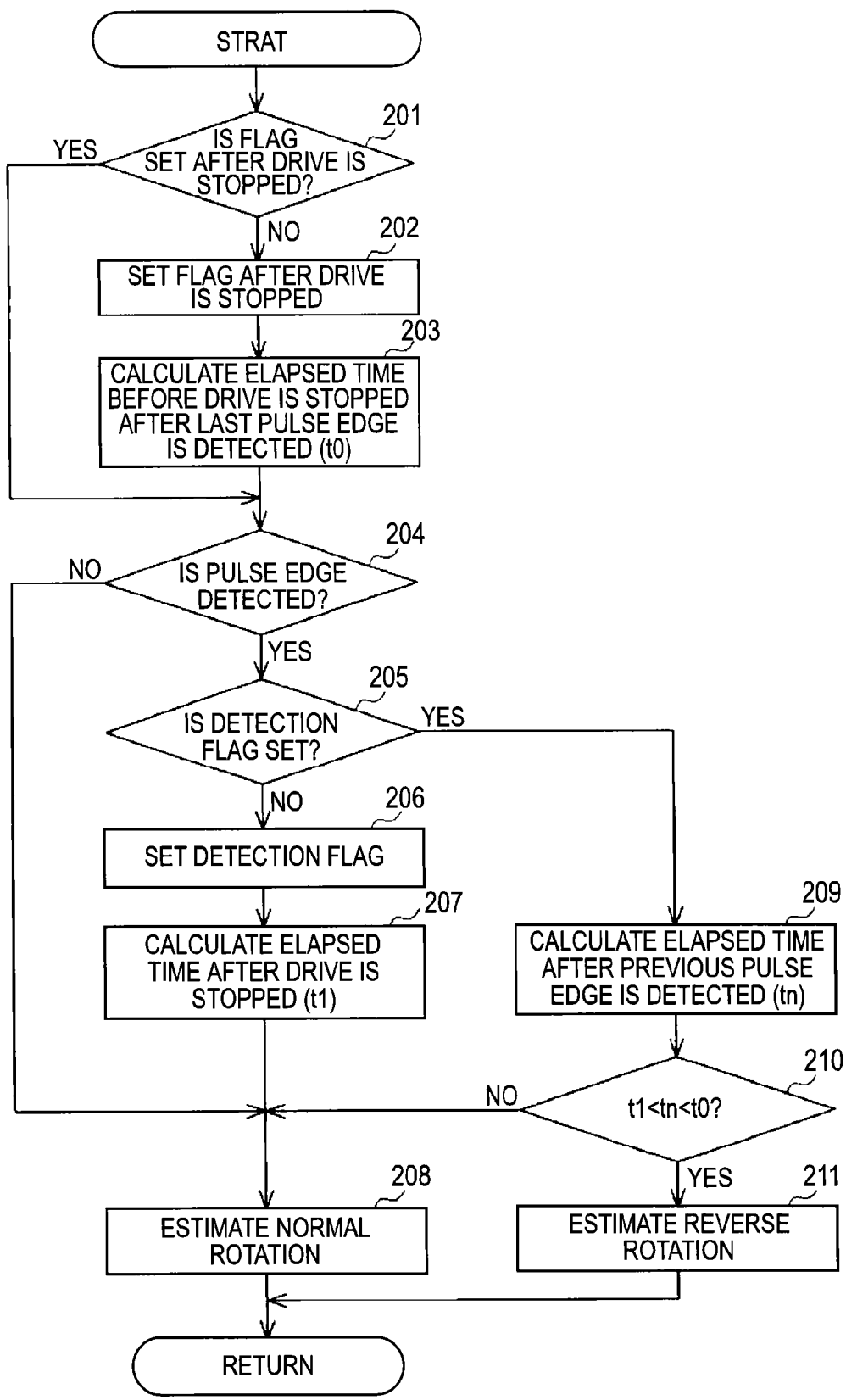
FIG. 3 is a flow chart illustrating a process sequence of estimating a rotation direction after a motor drive is stopped, according to a first embodiment.

In particular, as illustrated by the flow chart in FIG. 3, the ECU 13 first determines whether or not a flag has already been set after the drive is stopped (Step 201). Then, in a case where a flag has not yet been set after the drive is stopped (Step 201: NO), that is, in a case where it is immediately after the motor drive is stopped, the ECU 13 sets a flag after the drive is stopped (Step 202), and calculates an elapsed time t0 from the time when the pulse edges are lastly detected before the motor drive is stopped (Step 203). Further, in the above-described Step 201, in a case where a flag has already been set after the drive is stopped (Step 201: YES), the processes of the above-described Steps 202 and 203 are not performed.

Next, the ECU 13 determines whether or not the pulse edge is detected in the pulse signal P input from the rotation sensor 16 (Step 204), and continuously determines whether or not a detection flag has already been set (Step 205), in a case where the pulse edge is detected (Step 204: YES). Then, in a case where a detection flag has not yet been set (Step 205: NO), that is, in a case where the first pulse edge is detected after the motor drive is stopped, the ECU 13 sets a flag (Step 206) and calculates an elapsed time t1 from the time when the motor drive is stopped (Step 207).

Furthermore, in the above-described Step 204, in a case where the pulse edge is not detected (Step 204: NO), the processes of the above-described Steps 205 to 207 are not performed. Then, in a case where the pulse edge is not detected like this and in a case where the first pulse edge is detected after the motor drive is stopped and the detection flag is set in Step 206, the ECU 13 of the present embodiment estimates that the rotation direction of the motor 11 is the same as the rotation direction before the drive is stopped (estimation of the normal rotation, Step 208).

On the other hand, in the above-described Step 205, in a case where the detection flag has already been set (Step 205: YES), that is, in a case where the pulse edges are continuously detected after the motor drive is stopped, the ECU 13 calculates an elapsed time tn from the time when the previous pulse edge is detected (Step 209). Then, the ECU 13 determines whether or not the elapsed time tn, that is, an interval of two pulse edges continuously detected after the motor drive is stopped is wider than the interval (elapsed time t1) from when the motor drive is stopped until the first pulse edge, and is narrower than the interval (elapsed time t0) from the last pulse edge before the motor drive is stopped until the motor drive is stopped (Step 210).

In a case where a determination condition of the Step 210 is satisfied (t1<tn<t0, Step 210: YES), the ECU 13 estimates that the reverse rotation occurs in the motor rotation, that is, that the motor 11 is rotated in the opposite direction to the rotation direction before the motor drive is stopped (estimation of the reverse rotation, Step 211). Then, in a case where the determination condition of the above-described Step 210 is not satisfied (Step 210: NO), the ECU 13 estimates that the rotation of the motor 11 is the normal rotation, by performing the above-described Step 208.

Figure 4:
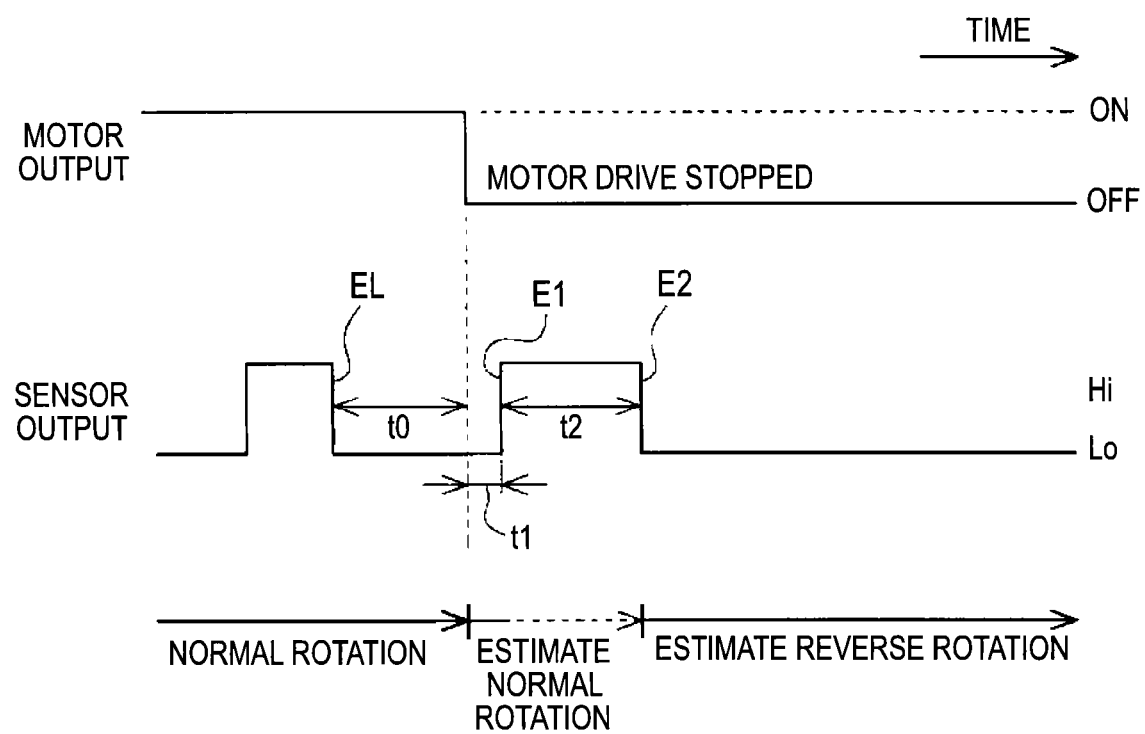
FIG. 4 is an explanatory view of estimating a rotation direction after a motor drive is stopped, according to the first embodiment.

That is, as illustrated in FIG. 4, the motor rotation until the motor drive is stopped is the normal rotation which is equal to the drive direction. In addition, even after the motor drive is stopped, the motor 11 is rotated due to inertia in the drive direction before the stop. In particular, in a case where the interval (elapsed time t1) from when the motor drive is stopped until a pulse edge E1 first detected after the motor drive is stopped is narrower, compared to the interval (elapsed time t0) from a pulse edge EL lastly detected before the motor drive is stopped until the motor drive is stopped, there is a high possibility that the motor rotation until the pulse edge E1 is detected may be the normal rotation.

Furthermore, if the motor rotation is the normal rotation based on the inertia, the motor rotation speed after the drive is stopped ought to be slower than the motor rotation speed before the drive is stopped. However, like an example illustrated in FIG. 4, in a case where the interval (elapsed time t2) from the first pulse edge E1 after the motor drive is stopped until a second pulse edge E2 is narrower than the interval (elapsed time t0) from the last pulse edge EL before the motor drive is stopped until the motor drive is stopped, an inconsistency occurs in this relation. That is, if the rotation direction is unchanged, the motor rotation speed after the motor drive is stopped is faster than that when the motor drive is stopped. Therefore, in this case, it is possible to estimate that the reverse rotation occurs in the motor rotation. Then, the ECU 13 as reverse rotation detection mechanism is configured to detect the reverse rotation occurring after the motor drive is stopped.

As above, according to the present embodiment, the following effects can be obtained.

(1) In a situation where the pulse edges (E1 and E2) are continuously detected after the motor drive is stopped, if the rotation direction is unchanged, the ECU 13 determines whether or not the motor rotation speed indicated by the pulse edges (E1 and E2) after the drive is stopped is faster than the motor rotation speed before the drive is stopped. Then, in a case where there is generated the pulse edge (E2) indicating such that the motor rotation speed after the drive is stopped is faster, the ECU 13 estimates that the reverse rotation occurs in the motor rotation.

That is, the motor rotation until the motor drive is stopped is the normal rotation which is equal to the drive direction. In addition, even after the motor drive is stopped, the motor rotation is the normal rotation due to the inertia. Then, if the rotation direction is unchanged, based on the inertia, the motor rotation speed after the drive is stopped is slower than the motor rotation speed before the drive is stopped. Therefore, according to the above-described configuration, it is possible to detect the reverse rotation occurring after the motor drive is stopped, with a simple configuration. As a result, it is possible to suppress the occurrence of an error in detecting the position based on counting the motor pulses.

(2) The rotation sensor 16 outputs the pulse signal P such that the pulse edge is generated at ½ rotation cycle of the motor 11. In addition, in a case where the pulse edges are continuously detected after the motor drive is stopped (Step 205: YES), the ECU 13 calculates the elapsed time tn from the time when the previous pulse edge is detected (Step 209). Furthermore, the ECU 13 determines whether or not the elapsed time tn, that is, the interval of two pulse edges continuously detected after the motor drive is stopped is wider than the interval (elapsed time t1) from when the motor drive is stopped until the first pulse edge, and is narrower than the interval (elapsed time t0) from the last pulse edge before the motor drive is stopped until the motor drive is stopped (Step 210). Then, in a case where the determination condition of the Step 201 is satisfied (t1<tn<t0, Step 210: YES), the ECU 13 estimates that the reverse rotation occurs in the motor rotation, that is, that the motor 11 is rotated in the opposite direction to the rotation direction before the motor drive is stopped (estimation of the reverse rotation, Step 211).

That is, in a case where the interval (elapsed time t1) from when the motor drive is stopped until the pulse edge E1 first detected after the motor drive is stopped is narrower, compared to the interval (elapsed time t0) from the pulse edge EL lastly detected before the motor drive is stopped until the motor drive is stopped, there is a high possibility that the motor rotation until the pulse edge E1 is detected may be the normal rotation. Then, in a case where the interval (elapsed time tn) of two continuous pulse edges (E1 and E2) after the motor drive is stopped is narrower than the interval (elapsed time t0) from the last pulse edge EL before the motor drive is stopped until the motor drive is stopped, if the rotation direction is unchanged, there occurs an inconsistency that the motor rotation speed after the motor drive being stopped is faster than that when the motor drive is stopped. Therefore, according to the above-described configuration, it is possible to detect the reverse rotation occurring after the motor drive is stopped.

Second Embodiment

Hereinafter, a second embodiment which embodies this disclosure will be described with reference to the accompanying drawings. Further, compared to the above-described first embodiment, the present embodiment is different in only an estimation method of a rotation direction after a motor drive thereof is stopped. Therefore, the same configuration as that of the first embodiment will have the same reference numerals and the description thereof will be omitted.

Figure 5:
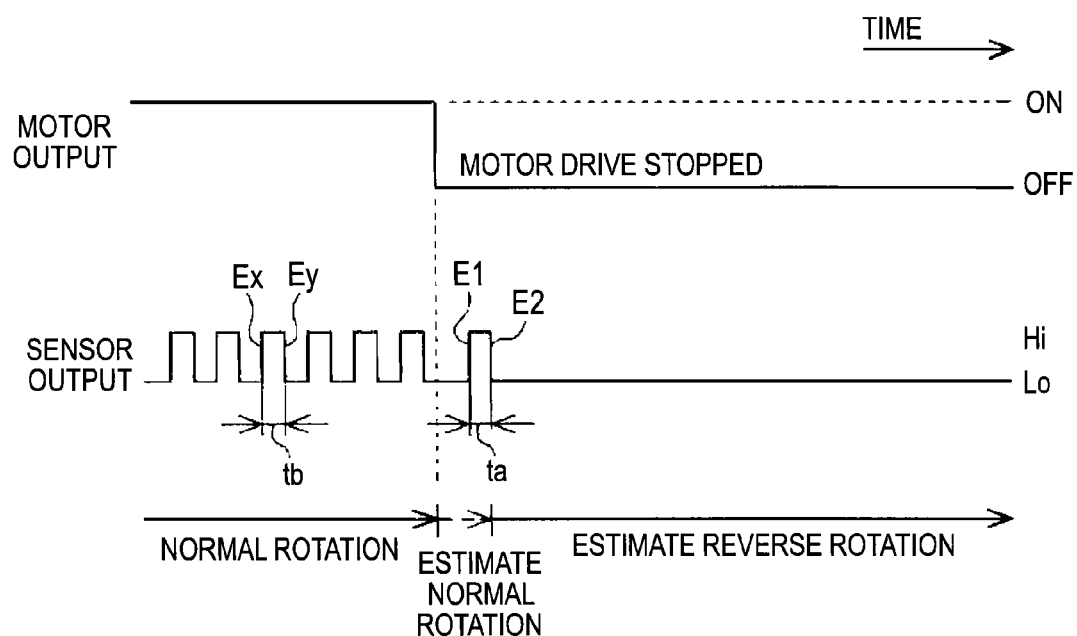
FIG. 5 is an explanatory view of estimating a rotation direction after a motor drive is stopped, according to a second embodiment.

As illustrated in FIG. 5, in the present embodiment, in a case where pulse edges are continuously detected after the motor drive is stopped, the ECU 13 calculates an interval of two pulse edges continuously detected after the motor drive is stopped, more specifically, a combination of a "rising edge (E1)" and a "falling edge (E2)" thereof, as a pulse width ta, In addition, the interval of two pulse edges continuously detected before the motor drive is stopped, more specifically, a combination of a "rising edge (Ex)" and a "falling edge (Ey)", which is the same as the above-described pulse width ta, is stored as a pulse width tb in the ECU 13. The ECU 13 reads out the stored pulse width tb and compares it with the pulse width ta after the motor drive is stopped. Then, in a case where the pulse width ta after the motor drive is stopped is narrower than the pulse width tb before the motor drive is stopped, the ECU 13 estimates that the reverse rotation occurs in the motor rotation.

In particular, as the pulse width tb before the motor drive is stopped, the ECU 13 maintains a minimum value of the elapsed time from when the rising edge (Ex) is detected until the falling edge (Ey) is detected. Further, as the pulse width (tb') before the motor drive is stopped, the ECU 13 also maintains the minimum value of the elapsed time from when the falling edge is detected until the rising edge is detected. Then, the ECU 13 is configured to read out the same combination as the two pulse edges E1 and E2 continuously detected after the motor drive is stopped, that is, the pulse width tb defined by the combination of the rising edge (Ex) and the falling edge (Ey) in an example illustrated in the same drawing.

That is, in such a manner that a difference of the pulse widths ta and tb before and after the motor drive is stopped is compared, it is possible to detect the occurrence of the pulse edge (E2) which causes such a inconsistency that if the rotation direction is unchanged, the motor rotation speed after the motor drive is stopped is faster than that when the motor drive is stopped, Therefore, according to the above-described configuration, the ECU 13 of the present embodiment can detect the reverse rotation occurring after the motor drive is stopped.

Figure 6:
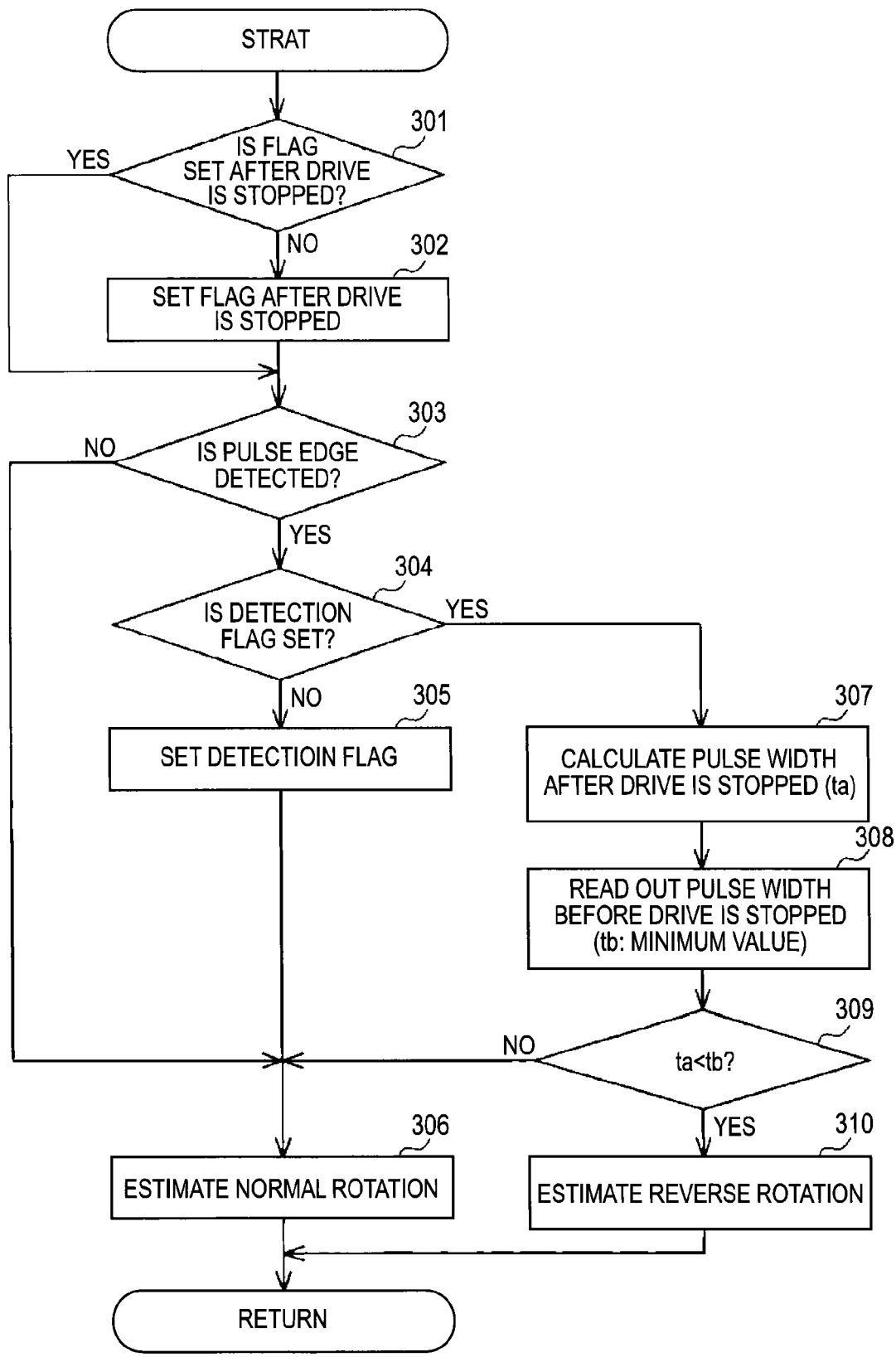
FIG. 6 is a flow chart illustrating a process sequence of estimating a rotation direction after a motor drive is stopped, according to the second embodiment.

More specifically, as illustrated by the flow chart in FIG. 6, the ECU 13 determines whether or not the flag is set after the drive is stopped (Step 301) and in a case where the flag has not yet been set after the drive is stopped (Step 301: NO), that is, in a case where it is immediately after the motor drive is stopped, the ECU 13 sets the flag after the drive is stopped (Step 302). Further, in a case where the flag has already been set after the drive is stopped (Step 301: YES), the process of the Step 302 is not performed.

Next, the ECU 13 determines whether or not the pulse edge is detected in the pulse signal P input from the rotation sensor 16 (Step 303). In a case where the pulse edge is detected (Step 303: YES), the ECU 13 continuously determines whether or not the detection flag has already been set (Step 304), and then sets the detection flag in a case where the detection flag has not yet been set (Step 304: NO), that is, in a case where the first pulse edge is detected after the motor drive is stopped (Step 305).

Further, in a case where the pulse edge is not detected in the above-described Step 303 (Step 303: NO), the processes of the above-described Steps 304 and 305 are not performed. Then, in a case where the pulse edge is not detected like this and in a case where the first pulse edge is detected after the motor drive is stopped, and the detection flag is set in Step 305, the ECU 13 of the present embodiment determines that the rotation of the motor 11 has the same rotation direction as that before the drive is stopped (estimation of the normal rotation, Step 306).

On the other hand, in a case where the detection flag has already been set in the above-described Step 304 (Step 304: YES), that is, in a case where the pulse edges are continuously detected after the motor drive is stopped, the ECU 13 calculates the pulse width ta after the motor drive is stopped (Step 307). Then, the ECU 13 reads out the pulse width tb before the motor drive is stopped (Step 308), and determines whether or not the pulse width ta after the motor drive is stopped is narrower than the pulse width tb before the motor drive is stopped (Step 309).

In a case where the pulse width ta after the motor drive is stopped is narrower than the pulse width tb before the motor drive is stopped (Step 309: YES), the ECU 13 estimates that the reverse rotation occurs in the motor rotation (Step 310). Then, in a case where the pulse width ta after the motor drive is stopped is wider than the pulse width tb before the motor drive is stopped (Step 309: NO), the ECU 13 performs the above-described Step 306 and thereby estimates that the rotation of the motor 11 is the normal rotation.

As above, according to the present embodiment, it is possible to obtain the same effect as that of the above-described first embodiment. Then, in such a manner that the difference between the pulse widths ta and tb before and after the motor drive is stopped is compared, it is possible to correspond to the pulse signal as well, which has a different generation cycle of the pulse edge from the above-described respective embodiments.

Further, the above-described respective embodiments may be changed as follows.

In the above-described respective embodiments, this disclosure is embodied in the seat slide apparatus 10. However, without being limited to this, if it is a configuration where the motor drive causes the configuring element of the vehicle seat to be moved in order to adjust the posture, and the motor pulses are counted to detect the movement position of the configuring element, the configuration may be adopted, for example, to the other vehicle seat apparatus such as a seat reclining apparatus, a seat lifting apparatus or an ottoman apparatus.

In the above-described respective embodiments, a magnetic rotation sensor using a hall element is used in the rotation sensor 16 of the present embodiment. However, without being limited to this, if it is possible to output the pulse signal P synchronized with the motor rotation, the rotation sensor may be the other type such as an optical type or a contact type.

In addition, in the above-described respective embodiments, the pulse edge is configured to occur at ½ rotation cycle of the motor 11 in the pulse signal P output by the rotation sensor 16. However, without being limited to this, the pulse edges may be generated twice (once for each rising and falling) or more for each rotation of the motor 11. For example, the rotation sensor may be used, which outputs the pulse signal such that the pulse edges are generated at ½ n rotation cycle (however, "n" is an integer) such as ¼ rotation cycle, ⅙ rotation cycle or ⅛ rotation cycle.

Furthermore, in the above-described second embodiment, in a case where the motor 11 is rotated at a constant speed, the rotation sensor may be used, which outputs the pulse signal such that the width of a ridge (from rising to falling) and the width of a valley (from falling to rising) in the pulse signal P are different from each other. That is, the generation cycle of the pulse edges in the pulse signal input from the rotation sensor may be not necessarily ½ n rotation cycle.

Figure 7A:
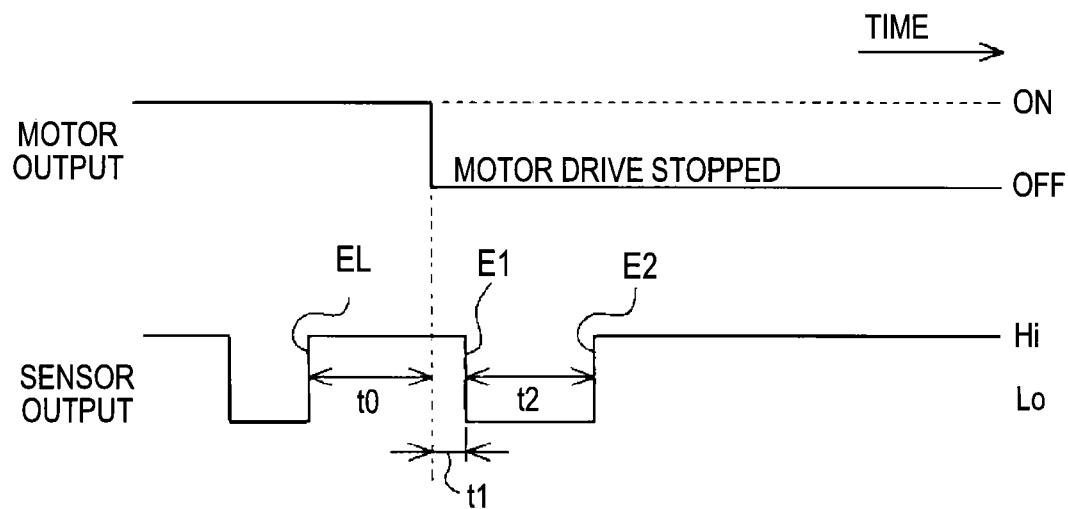
FIGS. 7A and 7B are explanatory views illustrating another example of estimating a rotation direction after a motor drive is stopped.
Figure 7B:
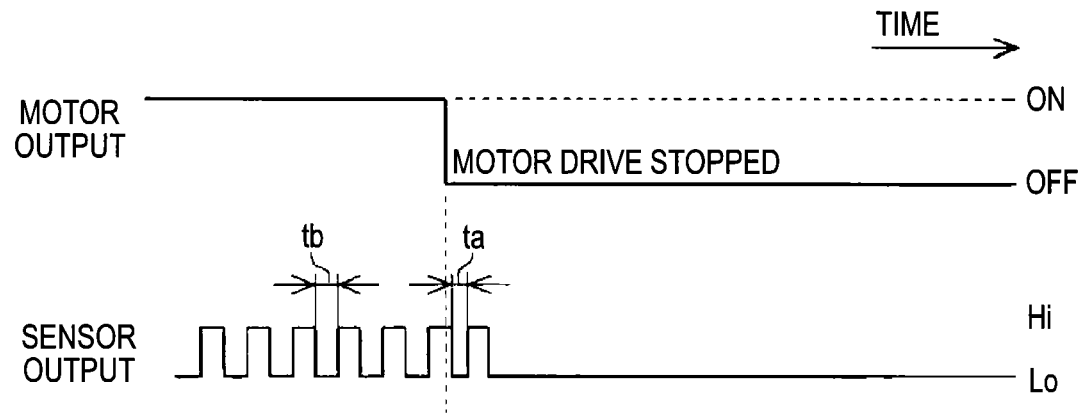

In addition, in the above-described respective embodiments, a case where the first pulse edge E1 after the motor drive is stopped is the "rising edge" is exemplified (refer to FIGS. 4 and 5), but the first pulse edge E1 after the motor drive is stopped may be the "falling edge" as illustrated in FIGS. 7A and 7B.

In this case, in the second embodiment, "the elapsed time (minimum value thereof) from when the falling edge is detected until the rising edge is detected", which is previously stored as the pulse width (tb) before the motor drive is stopped is read out.

In the above-described respective embodiments, the description was made using the pulse edge E1 first detected and the pulse edge E2 second detected after the motor drive is stopped (refer to FIGS. 4 and 5). However, without being limited to this, "the interval (elapsed time to and pulse width ta) of two pulse edges continuously detected after the motor drive is stopped" may be the interval of the pulse edges continuously detected after the second pulse edge.

Furthermore, the rotation speeds before and after the motor drive is stopped may be compared using a method other than the above-described respective embodiments. For example, it may be a configuration where the widths (elapsed time) thereof are compared using three pulse edges or more which have the combination of equal rising and falling.

In the above-described second embodiment, the "minimum value" is used as the pulse width tb before the motor drive is stopped. However, without being limited to this, it may be a configuration where an average value or an intermediate value is used.

In the above-described first embodiment, it is determined whether or not the interval (elapsed time tn) of two pulse edges continuously detected after the motor drive is stopped is wider than the interval (elapsed time t1) from when the motor drive is stopped until the first pulse edge, and is narrower than the interval (elapsed time t0) from the last pulse edge before the motor drive is stopped until the motor drive is stopped (refer to FIG. 3). Then, in a case where the determination condition is satisfied (t1<tn<t0, Step 210: YES), it is estimated that the reverse rotation occurs in the motor rotation (Step 211).

Figure 8:
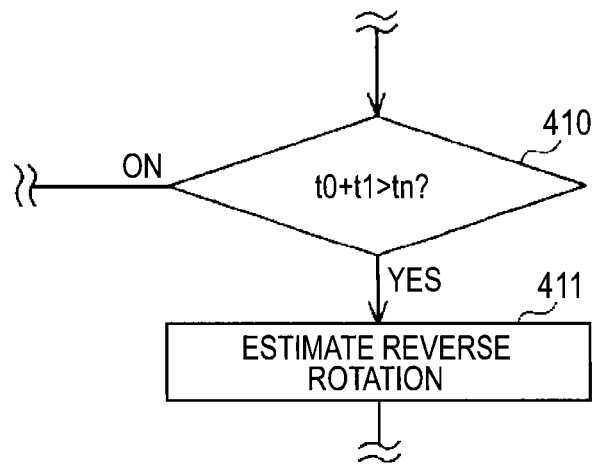
FIG. 8 is a flow chart illustrating another example of estimating a rotation direction after a motor drive is stopped.

However, without being limited to this, as illustrated by the flow chart in FIG. 8, it is determined whether or not the interval (elapsed time tn) of two pulse edges continuously detected after the motor drive is stopped is narrower than the interval (elapsed time t0+t1) from the last pulse edge (EL)

before the motor drive is stopped until the first pulse edge (E1) after the motor drive is stopped (Step 410). Further, each process (not illustrated) of Steps 401 to 409 is the same as each process of Steps 201 to 209 illustrated in FIG. 3 and accordingly the description thereof will be omitted. Then, in a case where the interval (elapsed time tn) of pulse edges after the motor drive is stopped is narrower (t0+t1>tn, Step 410: YES), it may be the configuration where it is estimated that the reverse rotation occurs in the motor rotation (Step 411).

That is, the motor 11 is rotated due to inertia after the drive is stopped. Then, in this case, the interval (elapsed time t2) of two pulse edges (refer to FIG. 4, E1 and E2) continuously detected after the motor drive is stopped ought to be wider than the interval (elapsed time t0+t1) from the pulse edge (EL) lastly detected before the motor drive is stopped until the pulse edge (E1) first detected after the motor drive is stopped. In other words, if the rotation direction is unchanged, this case also results in a inconsistency that the motor rotation speed after the motor drive is stopped is faster than that when the motor drive is stopped. Therefore, with the above-described configuration, it is possible to detect the reverse rotation occurring after the motor drive is stopped. Then, accordingly, it is possible to obtain the same effect as that of the first embodiment.

Figure 9:
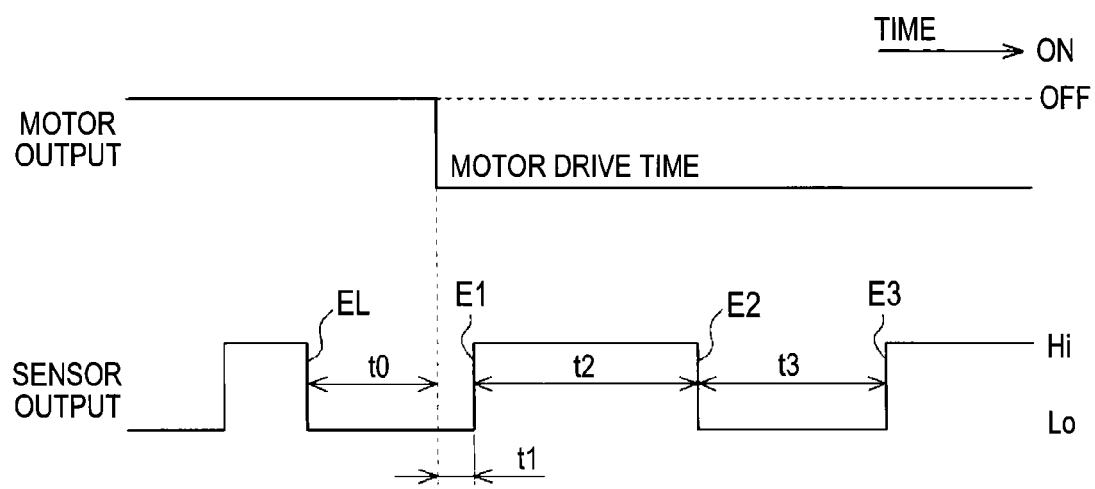
FIG. 9 is an explanatory view illustrating another example of estimating a rotation direction after a motor drive is stopped.

In addition, as illustrated in FIG. 9, between the intervals (t2 and t3) of the respective pulse edges (E1, E2 and E3) continuously detected after the motor drive is stopped, the interval (t3) of the last edge most recently detected and the interval (t2) of the edge detected immediately before the interval of the last edge are compared. Then, as described above, even in a case where it is determined that the reverse rotation does not occur in the motor rotation, according to the estimation of the reverse rotation based on the pulse edge (E1) first detected after the motor drive is stopped, in a case where the interval (t3) of the last edge most recently detected is narrower than the interval (t2) of the edge detected immediately before the interval of the last edge, it may be estimated that the reverse rotation occurs in the motor rotation.

That is, if the motor drive is in the normal rotation due to inertia after the motor drive is stopped, the interval (t3) of the last edge most recently detected ought to be wider than the interval (t2) of the edge detected immediately therebefore. Therefore, according to the above-described configuration, it is possible to more accurately detect the reverse rotation occurring after the motor drive is stopped.

The estimation method of the rotation direction described in the above-described respective embodiments and the above-described other examples may be performed in arbitrary combination therewith.

Next, the technical spirit which can be understood from the above embodiments will be described in conjunction with the effect.

It is the gist that the reverse rotation detection mechanism estimates that the motor rotation is the normal rotation during the time from when the motor drive is stopped until the pulse edge is first detected after the stop. That is, even after the motor drive is stopped, the motor is rotated in the drive direction of before the stop due to inertia. Therefore, it is possible to estimate that the motor rotation is the normal rotation during the time from when the motor drive is stopped until the pulse edge is first detected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly it is expressly intended that all such variations, changes and equivalents which fall within the spirit and scope of the present invention as defined in the claims, be embraced thereby.

What is claimed is:

1. A vehicle seat apparatus comprising:
   drive mechanism for moving configuring elements of a vehicle seat using a motor drive, in order to adjust a posture;
   control mechanism for controlling the operation of the drive mechanism;
   a rotation sensor which outputs pulse signals synchronized with a motor rotation;
   position detection mechanism for detecting a movement position of the configuring elements by counting pulse edges of the pulse signals according to the motor rotation direction; and
   reverse rotation detection mechanism for estimating that a reverse rotation has occurred in the motor rotation, in a situation where the pulse edges are continuously detected after the motor drive is stopped, if the rotation direction is unchanged, in a case where a motor rotation speed indicated by the pulse edges after the stop becomes faster than the motor rotation speed before the motor drive is stopped.

2. The vehicle seat apparatus according to claim 1, wherein the rotation sensor is to output the pulse signals generated by the pulse edges at ½ n rotation cycle, and
   wherein the reverse rotation detection mechanism estimates that the reverse rotation occurs in the motor rotation in a case where an interval between the two pulse edges continuously detected after the motor drive is stopped is wider than the interval from when the motor drive is stopped until the pulse edge first detected after the stop, and is narrower than the interval from the pulse edge lastly detected before the motor drive is stopped until the motor drive is stopped.

3. The vehicle seat apparatus according to claim 1,
   wherein the rotation sensor is to output the pulse signals in which the pulse edges are generated at ½ rotation cycle, and
   wherein the reverse rotation detection mechanism estimates that the reverse rotation occurs in the motor rotation in a case where the interval between the two pulse edges continuously detected after the motor drive is stopped is narrower than the interval from the pulse edge lastly detected before the motor drive is stopped until the pulse edge first detected after the motor drive is stopped.

4. The vehicle seat apparatus according to claim 2,
   wherein the rotation sensor is to output the pulse signals in which the pulse edges are generated at ½ n rotation cycle, and
   wherein the reverse rotation detection mechanism estimates that the reverse rotation occurs in the motor rotation in a case where the interval between the two pulse edges continuously detected after the motor drive is stopped is narrower than the interval from the pulse edge lastly detected before the motor drive is stopped until the pulse edge first detected after the motor drive is stopped.

5. The vehicle seat apparatus according to claim 2,
   wherein the reverse rotation detection mechanism estimates that the reverse rotation occurs in the motor rotation, even in a case where it is determined that the reverse rotation does not occur in the motor rotation, by the presumption, based on the pulse edge first detected after the motor drive is stopped, in a case where among the intervals of the respective pulse edges continuously detected after the motor drive is stopped, the interval of the last edges most recently detected is narrower than the interval of the edges detected immediately before the interval of the last edges.

6. The vehicle seat apparatus according to claim 3, wherein the reverse rotation detection mechanism estimates that the reverse rotation occurs in the motor rotation, even in a case where it is determined that the reverse rotation does not occur in the motor rotation, by the presumption, based on the pulse edge first detected after the motor drive is stopped, in a case where among the intervals of the respective pulse edges continuously detected after the motor drive is stopped, the interval of the last edges most recently detected is narrower than the interval of the edges detected immediately before the interval of the last edges.

7. The vehicle seat apparatus according to claim 4, wherein the reverse rotation detection mechanism estimates that the reverse rotation occurs in the motor rotation, even in a case where it is determined that the reverse rotation does not occur in the motor rotation, by the presumption, based on the pulse edge first detected after the motor drive is stopped, in a case where among the intervals of the respective pulse edges continuously detected after the motor drive is stopped, the interval of the last edges most recently detected is narrower than the interval of the edges detected immediately before the interval of the last edges.

8. The vehicle seat apparatus according to claim 1, wherein the reverse rotation detection mechanism estimates that the reverse rotation occurs in the motor rotation, in a case where a combination of a rising edge and a falling edge continuously detected or a combination of the falling edge and the rising edge is set to be a purse width, in a case where the pulse width after the motor drive is stopped is narrower than the pulse width before the motor drive is stopped.

9. The vehicle seat apparatus according to claim 2, wherein the reverse rotation detection mechanism estimates that the reverse rotation occurs in the motor rotation, in a case where a combination of a rising edge and a falling edge continuously detected or a combination of the falling edge and the rising edge is set to be a pulse width, in a case where the pulse width after the motor drive is stopped is narrower than the pulse width before the motor drive is stopped.

10. The vehicle seat apparatus according to claim 3, wherein the reverse rotation detection mechanism estimates that the reverse rotation occurs in the motor rotation, in a case where a combination of a rising edge and a falling edge continuously detected or a combination of the falling edge and the rising edge is set to be a pulse width, in a case where the pulse width after the motor drive is stopped is narrower than the pulse width before the motor drive is stopped.

11. The vehicle seat apparatus according to claim 5, wherein the reverse rotation detection mechanism estimates that the reverse rotation occurs in the motor rotation, in a case where a combination of a rising edge and a falling edge continuously detected or a combination of the falling edge and the rising edge is set to be a pulse width, in a case where the pulse width after the motor drive is stopped is narrower than the pulse width before the motor drive is stopped.

12. The vehicle seat apparatus according to claim 6, wherein the reverse rotation detection mechanism estimates that the reverse rotation occurs in the motor rotation, in a case where a combination of a rising edge and a falling edge continuously detected or a combination of the falling edge and the rising edge is set to be a pulse width, in a case where the pulse width after the motor drive is stopped is narrower than the pulse width before the motor drive is stopped.

13. The vehicle seat apparatus according to claim 7, wherein the reverse rotation detection mechanism estimates that the reverse rotation occurs in the motor rotation, in a case where a combination of a rising edge and a falling edge continuously detected or a combination of the falling edge and the rising edge is set to be a pulse width, in a case where the pulse width after the motor drive is stopped is narrower than the pulse width before the motor drive is stopped.

\* \* \* \* \*